United States Patent

Jarosinski

(10) Patent No.: US 8,697,250 B1
(45) Date of Patent: Apr. 15, 2014

(54) SELECTIVE OXIDATION OF A MODIFIED MCRALY COMPOSITION LOADED WITH HIGH LEVELS OF CERAMIC ACTING AS A BARRIER TO SPECIFIC OXIDE FORMATIONS

(71) Applicant: William Jarosinski, Carmel, IN (US)

(72) Inventor: William Jarosinski, Carmel, IN (US)

(73) Assignee: Praxair S.T. Technology, Inc., North Haven, CT (US)

( * ) Notice: Subject to any disclaimer, the term of this patent is extended or adjusted under 35 U.S.C. 154(b) by 0 days.

(21) Appl. No.: 13/767,486

(22) Filed: Feb. 14, 2013

(51) Int. Cl.
*B32B 15/04* (2006.01)
*B32B 15/20* (2006.01)
*C23C 4/06* (2006.01)
*C22C 19/07* (2006.01)
*C22C 19/00* (2006.01)
*C22C 30/00* (2006.01)
*A01B 29/00* (2006.01)
*F16C 13/00* (2006.01)

(52) U.S. Cl.
USPC ........... 428/633; 428/632; 428/678; 428/679; 428/336; 492/28; 420/437; 420/588

(58) Field of Classification Search
USPC ......... 428/632, 633, 628, 629, 630, 631, 639, 428/678, 679, 336
See application file for complete search history.

(56) References Cited

U.S. PATENT DOCUMENTS

| | | | |
|---|---|---|---|
| 2,714,563 A | 8/1955 | Poorman et al. | |
| 2,972,550 A | 2/1961 | Pelton | |
| 3,864,093 A | 2/1975 | Wolfla | |
| 4,124,737 A | 11/1978 | Wolfla et al. | |
| 4,822,689 A | 4/1989 | Fukubayashi et al. | |
| 4,902,539 A | 2/1990 | Jackson | |
| 5,741,556 A * | 4/1998 | Taylor et al. ................... | 427/453 |
| 6,572,518 B1 | 6/2003 | Midorikawa et al. | |
| 7,378,132 B2 | 5/2008 | Renteria et al. | |
| 8,211,506 B2 | 7/2012 | Blankenship et al. | |

OTHER PUBLICATIONS

Roger, C. Reed "The Superalloys Fundamentals and Applications", Chapter 5, "Enviornmental Degradation: The Role of Coatings". Cambridge University Press, New York (2006) ISBN-13 978-0-521-85904-2, pp. 283-313.

* cited by examiner

*Primary Examiner* — Michael E La Villa
(74) *Attorney, Agent, or Firm* — Nilay S. Dalal

(57) ABSTRACT

A composition based on a novel MCrAlY formulation is provided for the production of protective coatings. The specific combination of the constituents of the MCrAlY formulation advantageously allows significantly high loadings of ceramic (metal oxide) while still retaining the ability to selectively oxidize aluminum to form alumina scale, a property previously not attainable with conventional MCrAlY materials when loaded with ceramics at levels of 15-45 weight percent. The alumina scale in combination with the modified MCrAlY formulation act as a barrier to specific detrimental oxide formations. The compositions of the present invention can act as protective coatings for a wide array of applications.

13 Claims, No Drawings

SELECTIVE OXIDATION OF A MODIFIED MCRALY COMPOSITION LOADED WITH HIGH LEVELS OF CERAMIC ACTING AS A BARRIER TO SPECIFIC OXIDE FORMATIONS

FIELD OF THE INVENTION

The present invention relates to novel MCrAlY formulations in the production of protective coatings for a variety of applications, and methods for manufacturing coatings derived from same. Specifically, the MCrAlY coatings are a composite material which can be created with large volume amounts of ceramic while maintaining the ability to selectively form a particular protective oxide scale, which eliminates or delays the onset of the pick-up of adhered matter as well as other undesirable oxides.

BACKGROUND OF THE INVENTION

Continuous Annealing Lines (hereinafter, referred to as "CALs") are typically used in the heat treatment of steel strip. Vertical CALs and Continuous Galvanizing Lines (hereinafter, referred to as "CGLs") are ordinarily divided into respective sections of a heating furnace, a soaking furnace and a cooling furnace. A predetermined heat treatment cycle is performed by controlling the furnace temperature and the time the strip spends in each furnace section, which is commonly referred to as the strip speed. The heat treating sections are equipped with furnace rolls to allow a continuous annealing and/or a continuous galvanizing process. The furnace rolls act as transfer rolls located on the upper portion and the lower portion of the vertical heat treating sections, and a metal strip is passed while being suspended by these furnace rolls and subjected to a necessary time at temperature in a specific atmosphere. These rolls typically operate in temperatures ranging from 600° C.-1200° C. in a reducing atmosphere converting iron oxide to metallic iron. The rolls must be able to maintain the capability to convey the steel strip at high temperatures over long periods of continuous operation. However, as a result of the severe operating conditions, including, for example, faster line speeds, higher temperatures and the treatment of Advanced High Strength Steel (hereinafter, referred to as "AHSS"), the rolls can be subject to several potential problems, including wear of the roll surface and loss of the roll profile. Furthermore, adhesion of oxide or iron dust type particulate matter to the roll surface may be transferred from the strip to the roll during operation. The accumulation of adhesive material onto a roll surface is typically referred to as "pick-up". Pick-up of adhered matter can accumulate to a level where the furnace rolls are unable to convey and transfer the steel strip without creating quality blemishes on the strip surface. Accordingly, the furnace must be shut down so that the surface of the rolls can be cleaned or replaced. A furnace shut down causes a significant loss in terms of steel production. Additionally, vast quantities of energy are lost when the furnace is opened and allowed to cool for repair and then reheated to the annealing temperature. It is normal for a line to shut down once or twice a year for scheduled maintenance, but unscheduled shut-downs contribute to higher costs for steel producers.

As a means to delay the onset of the pick-up phenomena, it is well known to apply a protective coating layer on the surface of the rolls. For example, a combination ceramic with a metal alloy—can be used. Carbide materials can be used at low temperatures. Ni-based or Co-based alloys containing Cr and other alloying elements are used as the metal matrix so the mismatch in the coefficient of thermal expansion (CTE) between the heat resistant steel roll base and a pure ceramic does not lead to a short coating life (e.g., coating life limited by coating cracks and delamination due to the stresses form by CTE mismatch).

MCrAlY materials (where M represents metal that can include cobalt (Co), nickel (Ni) and/or iron (Fe); Cr represents chromium; Al represents aluminum; and Y represents yttrium) blended or loaded with ceramic materials have also been applied to high temperature furnace rolls to resist Fe and FeO transfer. Such materials have been used since the late 1970's in heat treatment furnaces, including, for example, a horizontal CAL. These coatings have also been incorporated into vertical CALs and CGLs since the early 1980's. Vertical CAL and CGLs today have larger furnace rolls and run at faster line speeds requiring the protective MCrAlY coating to not only resist the transfer or pick-up of Fe/FeO, but also to resist wear of the roll surface from the steel strip. Furnace rolls that are coated with MCrAlY materials containing approximately 10 weight percent ceramic loaded therein have performed well (exhibiting a typical life of 5-10 years) because the strip was made from mild or high strength low alloy (hereinafter, referred to as "HSLA"). Examples of such coated rolls are included in U.S. Pat. No. 4,124,737, which discloses MCrAlY loaded with 10 wt. % ceramic, and U.S. Pat. No. 4,822,689.

However, in the last ten years, the emergence of advanced high strength steel (hereinafter, referred to as "AHSS") presents new design challenges for protective MCrAlY coatings. The AHSS contains significantly more alloying elements (e.g., Al, Si, Mn and Ti) in comparison to mild strength steel or HSLA. The increased concentrations of alloying elements in AHSS have necessitated an influx of new generation MCrAlY coatings. Prior art efforts to solve this problem have been attempted as disclosed in U.S. Pat. No. 6,572,518, but further improvements are needed as the challenges associated with AHSS significantly increase.

Notwithstanding the newly designed MCrAlY formulations and coatings, the problem of pick-up remains prevalent. The adhered matter continues to accumulate to a level where the furnace roll pick-up causes quality blemishes on the steel strip, thereby causing the furnace to shut down for cleaning and smoothening of the surface of the rolls. Furthermore, steel strip used for automotive stampings has become thinner for weight savings, thereby allowing better automotive fuel economy. At the same time, the quality requirements have increased, whereby automotive customers are requiring premium finishes on the exposed body panels. Therefore, even reduced levels of pickup will impart blemishes or dents on the thinner strip, leading to quality issues and ultimately rejected strip.

In view of the problems associated with adhered matter pick-up on furnace rolls in the steel industry, there is an unmet need for an improved composite coating that would render oxidative and corrosive protection while resisting spallation, and also reduce and delay the incidence of buildup on furnace roll surfaces, thereby allowing higher quality steel strip and improved automotive finishes on exposed body panels.

SUMMARY OF THE INVENTION

The invention relates, in part, to a formulation used to produce coatings with special properties. Choices in starting materials and specific combinations of the materials with metallic and ceramic components (i.e., composite materials) have been found to significantly improve performance of the coating, resulting in a coated component that has superior properties that is particularly advantageous for furnace rolls used in the production of AHSS applications.

It has been found that utilizing a modified MCrAlY formulation with a predetermined amount of niobium (Nb) in combination with a ceramic material produces a composite coating exhibiting the necessary scale protection (for example, aluminum oxide layer) with a significant delay or reduction in adhered matter pick-up. The resulting protective coating acts to hinder specific detrimental oxide formations (for example, mixed oxides containing Mn).

The invention may include any of the following aspects in various combinations and may also include any other aspect of the present invention described below in the written description.

In a first aspect, a composite material, comprising: i. a modified MCrAlY formulation, the formulation characterized by an absence of silicon and hafnium, wherein M is selected from the group consisting of cobalt, nickel, iron and combinations thereof, wherein Co is in an amount of about 45-75 weight percent (wt %), Ni is an amount of about 0-12 wt % and Fe is in an amount of 0-12 wt %; Cr is in an amount of about 15-25 wt %; Y is in an amount of about 0.1-1.0 wt %; and Al is in an amount of 5-10 wt %; and Nb is in an effective amount of 6-15 wt %; and ii. a ceramic material, the ceramic material incorporated into the MCrAlY formulation in an amount from about 15-45 wt % of the composite material, wherein the ceramic material is a metal oxide; wherein the modified composition forms a resultant composite coating capable of selectively oxidizing Al as a protective alumina scale overlying the coating.

In a second aspect, a protective composite coating comprising: i. a first component represented by a modified MCrAlY and characterized by an absence of silicon and hafnium, wherein M is selected from the group consisting of cobalt, nickel, iron and combinations thereof, wherein Co is in an amount of about 45-75 wt %, Ni is in an amount of about 0-12 wt %, Fe is an amount of about 0-12 wt %; Cr is in an amount of about 15-25 wt %; Y is in an amount of about 0.1-1 wt %; and Al is in an amount of about 5-10 wt %; Nb is in an amount of about 6-15 wt %; ii. a second component comprising a ceramic material dispersed within the first component in an amount of 15-45 wt % of the protective composite coating.

In a third aspect, a method of applying a protective coating, comprising the steps of: (i) a modified MCrAlY formulation, the formulation characterized by an absence of silicon and hafnium, wherein M is selected from the group consisting of cobalt, nickel, iron and combinations thereof, wherein Co is in an amount of about 45-75 weight percent (wt %), Ni is an amount of about 0-12 wt % and Fe is in an amount of 0-12 wt %; Cr is in an amount of about 15-25 wt %; Y is in an amount of about 0.1-1.0 wt %; and Al is in an amount of 5-10 wt %; and Nb is in an effective amount of 6-15 wt %, O is in an amount of about 1-4 wt %; (ii) applying the modified MCrAlY formulation onto a substrate in a oxidizing environment with air plasma spray (APS) or high velocity detonation gun; and (iii) selectively oxidizing Al as a protective alumina scale overlying the coating.

In a fourth aspect, a protective coating comprising: a coating represented by the formula MCrAlY and characterized by an absence of silicon and hafnium, wherein M is selected from the group consisting of cobalt, nickel, iron and combinations thereof, wherein Co is in an amount of about 45-75 weight percent (wt %), Ni is an amount of about 0-12 wt % and Fe is in an amount of 0-12 wt %; Cr is in an amount of about 15-25 wt %; Y is in an amount of about 0.1-1.0 wt %; and Al is in an amount of 5-10 wt %; and Nb is in an effective amount of 6-15 wt %; and O is in an amount of about 1-4 wt %.

DETAILED DESCRIPTION OF THE INVENTION

The objectives and advantages of the invention will be better understood from the following detailed description of the preferred embodiments thereof in connection. The present disclosure relates to novel MCrAlY formulations in the production of protective coatings for a variety of applications. The formulations of the present invention are particularly suitable for high-temperature applications, including, but not limited to furnace rolls. The disclosure is set out herein in various embodiments and with reference to various aspects and features of the invention.

The relationship and functioning of the various elements of this invention are better understood by the following detailed description. The detailed description contemplates the features, aspects and embodiments in various permutations and combinations, as being within the scope of the disclosure. The disclosure may therefore be specified as comprising, consisting or consisting essentially of, any of such combinations and permutations of these specific features, aspects, and embodiments, or a selected one or ones thereof.

A novel MCrAlY composition has been discovered with significantly improved performance characteristics. As will be discussed herein, the MCrAlY protective coatings of the present invention can achieve enhanced performance, in relation to other types of materials, including conventional MCrAlY materials. Unless indicated otherwise, it should be understood that all compositions are expressed as weight percentages (wt %) based on the total weight of the formulation.

In a preferred embodiment, the MCrAlY composition of the present invention greatly reduces the problem associated with pick-up of adhered matter on furnace rolls and extends their life. The MCrAlY composition of the present invention represents a substantial improvement over conventional MCrAlY materials. The improved formulation is partially based upon selectively oxidizing aluminum to form an aluminum oxide layer or scale formation at significantly higher ceramic loadings than previously possible while minimizing and/or eliminating the formation of other oxide layers including mixed oxide layers. The term "scale" as used herein and throughout the specification refers to formation of an oxide layer of a passivating metallic oxide surface overlying the MCrAlY coated substrate. The ability to control a desired scale formation while suppress, minimize or substantially eliminate one or more other types of scale formation considered detrimental to sustained protection of the coating is referred to herein and throughout the specification as "selective oxidation."

The modified MCrAlY formulation, when applied to furnace rolls, can achieve the required chemical inertness and wear resistance without generating accumulation of adhesive pick-up. As previously mentioned above, M represents a metal that can be selected from cobalt (Co), nickel (Ni) and/or iron (Fe); Cr represents chromium; Al represents aluminum; and Y represents yttrium. Preferably, M is a combination of Co, Ni and/or Fe, with about 45-75 wt % Co, about 0-12 wt % Ni and about 0-12 wt % Fe. Cr is present in-an amount of 15-25 wt %. Y is present in an amount of 0.1-1 wt % to improve adherence of the protective scale, among other advantages. Al is present at about 5-10 wt %, and Nb is incorporated into the composition at about 6-15 wt %. In a more preferred embodiment, the formulation is about 50-65 wt % Co, 2-8 wt % Ni, 0-6 wt % Fe, 18-22 wt % Cr, 0.25-0.65 wt % Y, 6-8 wt % Al and 8-11 wt % Nb in an effective amount.

Unlike many conventional MCrAlY coatings, the inventive formulation described herein specifically excludes silicon and hafnium additives which are commonly employed in conventional MCrAlY coatings to help prevent detrimental oxide formations and impart improved properties such as oxide scale spallation under oxidation at high temperatures (1,000 to 1,500 C).

Generally speaking, incorporating a high amount of ceramic material into the MCrAlY material is desirable to achieve certain coating properties. It has been found that the blending or loading of additional ceramic material with the MCrAlY inventive composition offers improved performance due to the formation of alumina scale (having a thickness in the range of, for example, 2-25 micrometers). In order for conventional MCrAlY materials to form an alumina scale, they must have the proper level of Cr and Al and contain only a limited amount of ceramic material such as a metal oxide (e.g. alumina). Testing of prior art comparative examples (as will be shown below) showed only the inventive composition could form an alumina scale when loaded with high levels of ceramic of about 15-45 wt. %. Unlike the present invention, the prior art compositions formed a chromia scale at such high levels of ceramic loadings.

Various ceramic materials, specifically metal oxides, can be combined, loaded, or blended with the modified MCrAlY composition, such as, for example, alumina, alumina doped with other metal ions, zirconia, aluminosilicates, yttria, yttria stabilized zirconia, magnesia stabilized zirconia, zircon, zirconia toughened alumina, silica, mullite, and combinations thereof. In a preferred embodiment, the ceramic material is alumina represented by the formula Al2O3. High loading of alumina ceramic material imparts to the resultant coating favorable properties of high temperature hardness, wear resistance, structure and durability and creep resistance.

The effectiveness of the modified MCrAlY coating performance has been discovered to be at least partially dependent upon its ability to selectively oxidize Al to form alumina scale while suppressing, substantially minimizing or eliminating formation of other scaled oxides that are considered detrimental to the properties and sustained performance of the coating. Specifically, there has been no recognition that Cr2O3 scale ("Cr-rich scale") and other scale barriers can be generally inferior in performance to that of an Al2O3 scale barrier on furnace rolls used in the manufacture AHSS. The Cr2O3 barrier has traditionally been acceptable in normal operating conditions for mild, HSLA and AHSS Generation 1 applications (when operated in a reducing atmosphere). As such, conventional MCrAlY coatings have tended to favor Cr-rich scale formation. However, the present invention recognizes that Cr2O3 barriers can be prone to accelerated pickup when in contact with the oxide scale that forms on AHSS Generation 2 or 3 compositions, which are characterized by significantly higher amounts of alloying elements of Mn, Si, Al, Ti, etc. The increased concentrations of such alloying elements tend not to reduce from their respective oxide forms during the heat treatment atmosphere. As such, they are available to combine with other oxides and form detrimental complex oxides that accelerate pickup on furnace rolls.

The present invention recognizes that the type of scale that can form upon specific MCrAlY formulations is dependent on the amounts of chromium and aluminum within the MCrAlY. Additionally, ceramics including oxides that are added to the MCrAlY to form composite materials can act as a barrier and interfere with the type of scale that forms (specifically hindering the formation of alumina scale). Without being bound by any particular theory, it is believed that the transient Cr ions, which have a smaller ionic radius than Al ions, tend to move easier through the barrier-laden composite material. Under a high loading of ceramic material, for example, 15-45 wt. % of alumina, the prior art shows that the chromium ions diffuse to the coating surface where they oxidize to form Cr-rich scale, which can be generally represented by the formula Cr2O3.

It should be noted that even if conventional MCrAlY compositions are formulated with the correct Cr and Al ratios falling within the prescribed ranges of the present invention, the loading of high quantities of the ceramic material within conventional MCrAlY coatings tends to create a diffusion barrier for Al2O3 scale, thereby preventing the transport and diffusion of Al from within the matrix of the modified MCrAlY coating to the coating surface. As a result, the formation of Al2O3 scale is substantially hindered. In place of Al2O3 scale, Cr appears to diffuse to the coating surface, at least in part due to chromium having a smaller ionic radius than aluminum. As such, the Cr oxidizes at the surface to form a Cr2O3 scale barrier, which is considered an inferior scale within the context of the present invention.

As will be shown in the comparative examples, Cr-rich scale can be a precursor to formation of the problematic adherent pick-up on the furnace rolls that can ultimately lead to a failure mechanism of the furnace rolls. For example, it has been discovered that Cr2O3 can react with manganese oxide from steel strips to form a particular type of complex oxide, designated by the empirical formula MnCr2O4. This structure is considered a mixed oxide or complex oxide formulation represented by the general formula $(A^{+2})_1(B^{+3})_2O_4$, where Mn is metal A with a +2 oxidation state and Cr is metal B with a +3 oxidation state. Still further, other alloying elements contained within the steel strip and which are not reduced in the furnace can react with Cr2O3 to form other complex oxides. Generally speaking, formation of complex oxides are problematic. Complex oxides can form adhesive materials that can accumulate between the rolls and steel strip or plate to an unacceptable level where the rolls are unable to convey and transfer the steel strip or plate without causing quality blemishes on the steel product. The accumulation of detrimental complex oxides to such levels cause the CALs and CGLs to shutdown so that the surface of the furnace rolls can be cleaned or more likely the rolls replaced, thereby resulting in a shortened roll life. An increase in operational costs from such shutdowns and lower throughput is an ongoing problem.

In this regard, the modified MCrAlY coatings of the present invention are specifically formulated towards selectively oxidizing alumina scale formation while minimizing or substantially eliminating other types of scale, including chromia scale. The overlying alumina scale acts as a protective surface oxide to the coating that is capable of adequately protecting substrate surfaces which are in contact with materials containing significantly higher amounts of alloying elements of Mn, Si, Al, Ti, and their corresponding oxide forms than previously encountered. The desirable oxidation resistance of the underlying furnace roll surface is dependent upon the formation of the protective alumina surface oxide along the coating top surface. Alumina scale formed upon the modified MCrAlY acts as a physical and relatively inert barrier to corrosion and/or further oxidation in high temperature, corrosive environments. Surprisingly, the continuous alumina scale formed over the coating with significant Nb addition to the modified MCrAlY is more resistant to complex oxide formation and the creation of pickup on the coating surface. A modified MCrAlY coating containing a high loading of ceramic and still capable of forming a continuous alumina layer is considered a suitable protective coating for several high temperature applications, including, for example, turbine engine components.

The ability to achieve selective oxidation of alumina scale may be impacted, at least in part, by the relative amounts of Al to Cr within the inventive MCrAlY composition. Upon the basis of an extensive screening of MCrAlY formulations, to be discussed below, it was found that controlling the relative amounts of Al and Cr can be indicative of the nature of protective oxide scale that forms along the coating at the high ceramic loadings. If Al and Cr are below the formulation amounts of the present invention, a weak metal oxide (Ni, Co or Fe based) scale has been observed to form that is not protective in oxidizing or corrosive environments. On the other hand, with sufficient Cr and low Al below the formulation of the present invention, a chromium oxide (i.e., Cr2O3) scale has been observed to form. As previously mentioned, although the chromium oxide scale tends to be protective for some corrosive environments, it does not appear as protective as aluminum oxide (Al2O3) scale. With sufficient Cr and Al, each of which is within the range of the modified MCrAlY formulations of the present invention, a protective aluminum oxide scale has been observed to form. The specific formulations of MCrAlY of the present invention disclosed herein allow selective oxidation to occur, in which alumina scale is formed and chromia scale and other scales considered non-beneficial to the coating properties are minimized.

In addition to selective oxidation of alumina scale, the present invention is also unique for possessing the capability to maximize the loading of ceramic materials, such as alumina, for example, within the MCrAlY coating, while still enabling aluminum from the MCrAlY material to selectively oxidize and form alumina scale. In one embodiment, it has been surprisingly found that the modified MCrAlY formulations can be loaded with ceramic (e.g., alumina, alumina doped with other metal ions, zirconia, aluminosilicates, yttria, yttria stabilized zirconia, magnesia stabilized zirconia, zircon, zirconia toughened alumina, silica, mullite, and combinations thereof) of about 15-45 wt % or, preferably 18-32 wt %, or more preferably, 20-30 wt %, while still retaining the ability to selectively oxidize Al and form alumina scale along the modified MCrAlY coating surface. In a preferred embodiment, the ceramic to be loaded into the MCrAlY is alumina. The high loading of alumina ceramic provides the MCrAlY coating with structural stability by virtue of the ceramic oxide dispersion strength that is characterized by sufficient creep resistance, high wear hardness and high temperature hardness. These attributes of structural stability provide adequate support for the overlying alumina scale at elevated temperatures as high as 1000° C. or greater.

Accordingly, the present invention involves a combination of selected elements to achieve formation of alumina scale at high ceramic loadings of 15 wt % or greater. In addition to maintaining levels of Al and Cr within the requisite ranges of the present invention, niobium is preferably present (Nb) in an effective amount of about 6-15 wt %. Without being bound by any theory, it is believed that Nb can help create conditions within the modified MCrAlY coating conducive for formation of a layer of a continuous alumina scale along the coating surface, even under conditions of higher alumina loadings. Manipulating the effective amount of Nb seems to be responsible for increasing the maximum ceramic material that can be loaded into the MCrAlY coating while still allowing formation of a protective alumina scale along the surface of the coating. The Nb, by an unknown mechanism, may be preferentially aiding and/or stabilizing the alumina scale formation on the modified MCrAlY coating surface while simultaneously suppressing chromia formation and the ability of complex oxides to form upon its surface. As such, the Nb appears to be involved in a favorable mechanism that delays the onset and reduces the overall amount of complex oxide formed on the coating surface. For instance, as will be described in the Examples, incorporating 20-30 wt % alumina ceramic into the modified MCrAlY formulation still allows a layer of Al2O3 scale to form as the protective scaled surface of the coating with no detection of Cr-rich scale.

On the contrary, conventional MCrAlY coatings with ceramic material loadings approaching 20-30 wt % have not been capable of forming alumina scale on the surface. Rather, conventional MCrAlY coatings typically cannot exceed a loading of 15 wt % ceramic material and still form a continuous alumina scale, as shown in the comparative examples below. As previously mentioned, elevated levels of ceramic material (e.g., alumina) loaded at greater than 10 wt % has an aggregate size and volume that may act as a roadblock for aluminum diffusion to the MCrAlY coating surface. Under these conditions, chromium can diffuse to the surface to form the less protective Cr-rich scale, which has been discovered to be a potential source for formation of the mixed oxides or complex oxides associated with pick-up.

The presence of Nb within a specific weight percentage range and the ratio of Al and Cr within a specific range create a synergistic relationship in which high ceramic loadings can be incorporated into the modified MCrAlY coating without undermining the selective oxidation of Al to alumina scale at the coating surface. Nb appears to inhibit the formation of mixed oxide structures (e.g., MnCr2O4 can be prevalent when Cr2O3 scale and/or oxygen is present, along with possible MnAl2O4 formation). As such, one possible benefit of Nb is the limitation of Cr and Mn diffusion and interaction. The synergism also offers the ability to apply the formulations in oxidizing environments. In comparison, conventional MCrAlY coatings are required to be applied onto substrates at low oxygen environments so that the oxide scale along the surface can be formed in a subsequent heat treatment step. Elevated levels of oxygen contained within the coating form detrimental internal oxides that can act as a diffusion barrier that potentially prevents alumina scale formation along the surface. As a result, thermal spray procedures for applying conventional MCrAlY coatings typically require maintaining oxygen low to enable controlled oxide scale formation along the surface of the coating. To this end, relatively complex and expensive surface enhancement processes such as electron beam physical vaporization (EBPVD), low pressure plasma spraying (LPPS), or shrouded plasma spraying, which utilizes an inert gas shield to minimize oxygen entrainment in the process, are required to maintain low oxygen content in the resulting coating.

The modified MCrAlY may offer the unique ability to utilize air plasma spray techniques, which is considered a simplified spray process relative to EBPVD, LPPS or shrouded plasma spray processes. Air plasma spraying the inventive coatings onto a substrate can form the desired alumina scale on the surface of the applied coating, despite the potential accumulation of high oxygen (e.g., 1-4 wt %) within the coating. As such, unlike conventional MCrAlY coatings, the accumulation of oxygen within the inventive coating and corresponding internal oxidation therewithin may not behave as a barrier for formation of alumina scale on the coating surface. The novel MCrAlY coatings of the present invention allow for a low-cost air plasma spray alternative not requiring a vacuum. Low-cost air plasma spray techniques have not been possible with conventional MCrAlY coatings. Numerous applications for such low-cost air plasma spraying may be suitable. The modified MCrAlY coating formulations of the present invention can be applied by a variety of spray techniques, including low pressure plasma spray (LPPS), air plasma spray (APS), shrouded APS, high velocity oxygen fuel (HVOF), or high velocity detonation gun (D-gun or Super D-gun). In one embodiment, a detonation gun spray technique can be utilized, as described in U.S. Pat. Nos. 5,741,556; 2,714,563; 2,972,550; and 4,902,539, each of which is incorporated by reference in its entirety. Generally speaking, the detonation gun process involves the ignition of an oxygen-hydrocarbon fuel mixture to produce a detonation wave. The detonation wave travels down a barrel whereupon the coating material is heated and accelerated (thereby imposing a temperature and a velocity within the material) out of the barrel onto an article to be coated. The ability to apply the formulations of the present invention in the presence of oxygen allows less complex and lower cost techniques compared to previous spray techniques which requires low oxygen. Moreover, the ability of the present invention to selectively oxidize formation of alumina scale during the spray process is advantageous as subsequent heat treatment steps for formation of a selective oxide scale can be eliminated, thereby further streamlining the process of applying the coatings.

Accordingly, the inventive compositions can contain elevated amounts of oxygen within the coating in comparison to conventional MCrAlY materials, and still retain the ability to undergo selective oxidation to form a protective alumina scale on the coating surface. Furthermore, high amounts of ceramic, particularly metal oxides (e.g. alumina) can be loaded into the coating. The higher amounts of oxides and alumina within the coating surprisingly do not create a barrier for alumina scale formation upon the coating surface. In other words, the aluminum from within the MCrAlY coating is able to form alumina scale despite the higher loading of ceramic, which would be expected to act as a barrier to oxygen transport because of its aggregate size within the coating. The modified MCrAlY formulations in combination with the Nb appear to alter the behavior of the coating to prevent or hinder complex oxide formations on the coating surface (especially when exposed to the unreduced oxides found in AHSS).

The modified MCrAlY formulations of the present invention are suitable for a variety of applications besides furnace rolls. For instance, the modified MCrAlY formulations with high ceramic loadings of 20-30 wt % can be coated for applications requiring high temperature oxidation resistance, high temperature corrosion resistance and high temperature wear resistance, such as in the high temperature components of turbine blades in the aviation or the power generation industries. With respect to aviation, components coated with the modified MCrAlY blended with alumina, the alumina scale can act as an effective diffusion barrier that is chemically inert to the oxides of manganese, titanium and silicon. The same properties which allow the modified MCrAlY formulations to act as an effective diffusion barrier against formation of unwanted oxides, such as the above-described mixed oxides on furnace rolls, allows the modified MCrAlY formulations to protect surfaces of aviation components.

In still other applications, the modified MCrAlY formulation can be utilized as a bond coat for overlying thermal barrier coatings. The selective oxidation of alumina scale acts as an effective diffusion barrier for reducing the growth of thermally grown oxide (TGO) at the interface between the bond coat and the overlying thermal barrier coating. The alumina scale acts as a better diffusion barrier for oxygen into and out of the bond coat compared to other scales such as Cr-rich scales. The alumina scale also has greater inertness compared to other scales such as Cr-rich scales. As a result, the alumina scale can have a thickness of only a few microns, such as, preferably 2-25 microns, or more preferably 2-5 microns. Furthermore, the increased loading of ceramic, specifically metal oxides (e.g. alumina) into the MCrAlY bond coat causes the bond coat to have less residual stresses as a result of coefficient of thermal expansion mismatch between the substrate and the ceramic. In this manner, the overlying thermal barrier coating is more compliant, having a reduced tendency to spall or crack, thereby extending the operational lifetime of the thermal barrier coating. The modified MCrAlY formulations are therefore capable of performing as a better bond coat compared to other conventional bond coats by limiting TGO growth in situ for various high temperature applications, including gas turbine and aerospace turbine components.

It should be understood that variations of the modified MCrAlY formulations can be utilized. By way of example, the modified MCrAlY formulations of the present invention can be utilized without substantial loading of ceramic materials for those applications where high levels of ceramic loading are not required. In one embodiment, the ceramic loading may occur in a range of about 15 wt % or lower. In still other applications, the modified formulation may not include any loading of ceramic, which may be sufficient for applications where no ceramic loading is required or sufficient metal oxides are formed from oxygen present at the time of composite deposition.

As will be shown and discussed below in the Examples, several experiments were performed to compare the formulations of the present invention with other materials. The criteria for a successful formulation was dependent upon the ability to blend a large amount of ceramic within the formulations while maintaining the ability to selectively oxidize the desired protective scale.

The experiments simulated furnace conditions for CALs and CGLs. Generally, furnace atmospheres for CALs and CGLs that run advanced high strength steel for automotive applications target low amounts of oxygen, as a result of a reducing atmosphere. In this regard, CALs and CGLs that run AHSS strip for automotive applications use a reducing atmosphere, typically created by supplying a nitrogen-hydrogen mix that creates a high negative dew point (i.e., low oxygen content). These large furnaces are typically seldom air tight. As such, the furnaces can have elevated levels (in the parts per million range, ppm) of oxygen in the furnace atmosphere.

A lab furnace test was used to replicate the pick-up seen in CALs and CGLs. The testing methodology employed was the same for each of the Examples. One inch diameter test buttons were made from Type 304 stainless steel (Fe—Cr—Ni alloy) and were utilized for the purpose of simulating the heat resistant steel castings used as the furnace roll base or substrate (typical castings include Fe—Cr—Ni alloy Type HF, similar to wrought Type 302, and Type HH, similar to wrought Type 309). The stainless steel test buttons were coated with MCrAlY formulations with varying amounts of ceramic dispersed therein. The lab furnace that was employed in each of the tests included a quartz tube type capable of operating at 900° C. in a flowing gas. The flowing gas can be argon, Ar, to simulate the low amount of oxygen (e.g. 10-100 ppm) found in CALs and CGLs that run AHSS.

In order to properly compare the modified MCrAlY formulations of the present invention with other materials, the lab test was specifically designed to simulate accelerated pick-up. When test samples were compared to samples of coating that were used in an actual CAL and CGL, it was determined that 2-4 weeks of lab testing simulated 2-3 years of coated furnace roll life with regards to the pick-up that attached to the surface of the coating. In this regard, argon was supplied as the flowing gas (at a flow rate of 5 CFH, cubic feet per hour), and the supply of argon was configured in such a way as to enter the closed end of a 2.25 inch (5.7 cm) diameter quartz tube. Insulation was used to form a semi-closed end and resulted in a slightly positive pressure in the furnace so Ar would leak out and minimal oxygen (i.e., 10-100 ppm) would enter into the furnace atmosphere. When the coated samples were placed into the furnace, Fe/FeO, and Mn/MnO powder were sprinkled onto surfaces of the coated samples for the purpose of replicating the high levels of Mn/MnO typically found in AHSS steel and the corresponding oxides that form on the strips. The nature of the scale that was formed on top of the coated surfaces was determined by scanning electron microscopy (SEM) using energy dispersive spectroscopy (EDS) to provide analysis in the form of elemental dot maps. The colorized elemental dot maps overlay photomicrographs to illustrate where the elements are present and to indicate the types of phases and compounds present.

COMPARATIVE EXAMPLE 1

A conventional MCrAlY formulation (designated herein as Comparative Example 1 and disclosed in U.S. Pat. No. 4,124,737) was employed to produce a coating using a process described in U.S. Pat. No. 5,741,556, which is incorporated herein by reference in its entirety. The MCrAlY had a composition of 54 wt % Co, 25 wt % Cr, 7.5 wt % Al, 10 wt % Ta and less than 1% for each of Y, Si, and C. The MCrAlY was blended with 10 wt % Al2O3 ceramic to produce a composite mixture of 90 wt % MCrAlY and 10 wt % Al2O3, which was equivalent to 75 vol % MCrAlY and 25 vol % Al2O3. As explained above, the coating was applied onto an austenitic stainless steel substrate. The resultant coating composition was 51 wt % Co, 22.5 wt % Cr, 12 wt % Al, 9 wt % Ta, 5 wt % O and less than for each of 1% Y, Si, and C. The furnace conditions were designed to accelerate and simulate the pickup found on coated furnace rolls in CALs and CGLs.

After 2 weeks, alumina scale did form on the coating surface, which indicated that aluminum from within the coating (loaded with 10 wt % alumina) was capable of diffusing to the coating surface to form an oxide scale. However, the alumina scale that formed on the conventional MCrAlY formulation did not act as a barrier to detrimental mixed oxide formations. Elemental dot maps showed that the Fe/FeO and Mn/MnO reacted with Al2O3 scale to form mixed oxide formations that would yield pickup in CALs or CGLs running AHSS.

COMPARATIVE EXAMPLE 2

A conventional MCrAlY formulation (designated herein as Comparative Example 2 and disclosed in U.S. Pat. No. 4,822,689) was employed to produce a coating using the process described in U.S. Pat. No. 5,741,556. The MCrAlY had a composition of 54 wt % Co, 25 wt % Cr, 7.5 wt % Al, 10 wt % Ta and less than 1% for each of Y, Si, and C. The MCrAlY was blended with 30 wt % Al2O3 ceramic to produce a composite mixture of 70 wt % MCrAlY and 30 wt % Al2O3, which was equivalent to 50 vol % MCrAlY and 50 vol % Al2O3. The coating was applied onto an austenitic stainless steel substrate. The resultant coating composition was 40 wt % Co, 17.5 wt % Cr, 21 wt % Al, 7 wt % Ta, 14 wt % O and less than 1% for each of Y, Si, and C. The furnace conditions, similar to Comparative Example 1, were designed to accelerate and simulate the pickup found on coated furnace rolls in CALs and CGLs.

Instead of Al2O3 scale, Cr2O3 scale formed on the surface of the coating, which indicated that the aluminum was not capable of diffusing to the coating surface to form an oxide scale. The high volume fraction of Al2O3 (30% by weight) in the composite acted as a barrier. The chromia scale that formed on the conventional MCrAlY formulation did not prevent detrimental mixed oxide formations. Elemental dot maps showed that Mn/MnO reacted with Cr2O3 scale to form mixed oxide formations, e.g. MnCr2O4 (a common component in pickup associated with AHSS production).

COMPARATIVE EXAMPLE 3

Another conventional MCrAlY formulation (designated herein as Comparative Example 3 and disclosed as a derivative of U.S. Pat. No. 6,572,518) was employed to produce a coating using the process described in U.S. Pat. No. 5,741,556. The MCrAlY had a composition of 75 wt % Ni, 16 wt % Cr, 5 wt % Al, 3 wt % Fe and 0.5 wt % Y. The MCrAlY was blended with 30 wt % ceramic to produce a composite mixture of 70 wt % MCrAlY and 30 wt % ceramic, which was equivalent to 50 vol % MCrAlY and 50 vol % ceramic. The ceramic was a mixture of Y2O3 and Cr3C2. The Y2O3 had a formulation of 79 wt % Y and 21 wt % O (and consisted of 20 wt % of the total composite). The Cr3C2 had a formulation of 87 wt % Cr and 13 wt % C (and consisted of 10 wt % of the total composite). The coating was applied onto an austenitic stainless steel substrate. The resultant coating composition was 53 wt % Ni, 20 wt % Cr, 3.5 wt % similar to Comparative Example 1, were designed to accelerate and simulate the pickup found on coated furnace rolls in CALs and CGLs.

Cr2O3 scale formed on the surface of the coating, which indicated that the aluminum was not capable of diffusing to the coating surface to form an alumina scale. The high volume fraction of ceramic material (i.e., 20 wt % Y2O3 and 10 wt % Cr3C2) in the composite acted as a barrier. The chromia scale that formed on the conventional MCrAlY formulation did not prevent detrimental mixed oxide formations. Elemental dot maps showed that Mn/MnO reacted with Cr2O3 scale to form mixed oxide formations, having the formula MnCr2O4 (a common component in pickup associated with AHSS production).

COMPARATIVE EXAMPLE 4

100% alumina (Al2O3) was employed to produce a top coating layer (with approximately 50 micrometers thickness) using the process described in U.S. Pat. No. 5,741,556. Due to the CTE mismatch at 900 C between an alumina layer and austenitic stainless steel, a bond coat layer (50 micrometers of Comparative Example 1) was used to form a CTE gradient and reduce the CTE mismatch stress between the alumina austenitic stainless steel substrate. The furnace conditions, similar to Comparative Example 1, were designed to accelerate and simulate the pickup found on coated furnace rolls in CALs and CGLs. The alumina layer did not act as a barrier to detrimental mixed oxide formations. Elemental dot maps showed that Fe/FeO and Mn/MnO reacted with Al2O3 scale to form mixed oxide formations.

The results suggested that although Al2O3 formation along the roll surface was expected to act as a protective layer, alumina did not form a barrier to prevent mixed oxide formations that could lead to pickup in CALs and CGLs.

EXAMPLE 1

A modified MCrAlY formulation in accordance with the present invention (designated herein as Example 1) was employed to produce a thermal spray coating using the process described in U.S. Pat. No. 5,741,556. The modified MCrAlY had a composition of 57 wt % Co, 20 wt % Cr, 7.5 wt % Al, 10 wt % Nb, 5 wt % Ni and 0.5 wt % Y. The modified MCrAlY was not blended with any ceramic. The resultant coating composition therefore had the same composition as the modified MCrAlY, except for the addition of 1-2 wt % oxygen as the result of the formation of some internal oxides during the deposition process. The furnace conditions, similar to Comparative Example 1, were designed to accelerate and simulate the pickup found on coated furnace rolls in CALs and CGLs.

Al2O3 scale formed on the surface of the coating in Example 1. Elemental dot maps indicated no reaction with Mn/MnO and the alumina scale, but some Fe/FeO was found near the alumina scale layer. The alumina layer indicates that the coating of Example 1 could provide oxidation and corrosion resistance at elevated temperatures. The modified MCrAlY formulation of Example 1 could be used at elevated temperatures for oxidation and corrosion protection and provide resistance to some complex oxide formations.

EXAMPLE 2

A modified MCrAlY formulation was employed to produce a coating using the process described in U.S. Pat. No. 5,741,556. The modified MCrAlY had a composition of 57 wt % Co, 20 wt % Cr, 7.5 wt % Al, 10 wt % Nb, 5 wt % Ni and 0.5 wt % Y. The modified MCrAlY was blended with 20 wt % Al2O3 ceramic to produce a composite mixture of 80 wt % MCrAlY and 20 wt Al2O3, which was equivalent to 60 vol % MCrAlY and 40 vol % Al2O3. The coating was applied onto an austenitic stainless steel substrate. The resultant coating composition was 46 wt % Co, 16 wt % Cr, 17 wt % Al, 8 wt % Nb, 4 wt % Ni, 9 wt % O and <1 wt % Y. The furnace conditions, similar to Comparative Example 1, were designed to accelerate and simulate the pickup found on coated furnace rolls in CALs and CGLs.

Alumina scale did form on the coating surface, which indicated that aluminum from within the modified coating was capable of diffusing to the coating surface to form alumina scale despite 20 wt % alumina ceramic dispersed within the modified MCrAlY coating matrix. The modified MCrAlY composition highly loaded with alumina was able to form an alumina scale and prevent the formation of detrimental mixed oxides (i.e., like those associated with pickup when running AHSS) when analyzed by scanning electron microscopy (SEM) using energy dispersive spectroscopy (EDS).

EXAMPLE 3

A modified MCrAlY formulation was employed to produce a coating using the process described in U.S. Pat. No. 5,741,556. The modified MCrAlY had a composition of 57 wt % Co, 20 wt % Cr, 7.5 wt % Al, 10 wt % Nb, 5 wt % Ni and 0.5 wt % Y. The modified MCrAlY was blended with 30 wt % Al2O3 ceramic to produce a composite mixture of 70 wt % MCrAlY and 30 wt % Al2O3, which was equivalent to 50 vol % MCrAlY and 50 vol % Al2O3. The coating was applied onto an austenitic stainless steel substrate. The resultant coating composition was 40 wt % Co, 14 wt % Cr, 21 wt % Al, 7 wt % Nb, 3.5 wt % Ni, 14 wt % O and <1 wt % Y. The furnace conditions, similar to Comparative Example 1, were designed to accelerate and simulate the pickup found on coated furnace rolls in CALs and CGLs.

Alumina scale did form on the coating surface, which indicated that aluminum from within the modified coating was capable of diffusing to the coating surface to form alumina scale despite 30 wt % alumina ceramic dispersed within the modified MCrAlY coating matrix. The modified MCrAlY composition highly loaded with alumina was able to form an alumina scale and prevent the formation of detrimental mixed oxides (i.e., like those associated with pickup when running AHSS) when analyzed by SEM/EDS.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. A composite material, comprising:
   i. a modified MCrAlY formulation, the formulation characterized by an absence of silicon and hafnium, wherein
   M comprises Co in an amount of about 45 to about 75 weight percent (wt %), Ni is an amount of 0 to about 12 wt % and Fe is in an amount of 0 to about 12 wt %;
   Cr is in an amount of about 15 to about 25 wt %;
   Y is in an amount of about 0.1 to about 1.0 wt %;
   Al is in an amount of about 5 to about 10 wt %; and
   Nb is in an amount of about 6 to about 15 wt %; and
   ii. a ceramic material, the ceramic material incorporated into the MCrAlY formulation in an amount from about 15 to about 45 wt % of the composite material, wherein the ceramic material is a metal oxide.

2. The composite material of claim 1, wherein
   i. Co is in an amount of about 50 to about 65 weight percent (wt %), Ni is in an amount of about 2 to about 8 wt % and Fe is in an amount of 0 to about 6 wt %;
   Cr is in an amount of about 18 to about 22 wt %;
   Y is in an amount of about 0.25 to about 0.65 wt %;
   Al is in an amount of 6-8 wt %;
   Nb is in an amount of about 8 to about 11 wt %; and
   ii. the ceramic material is incorporated into the MCrAlY formulation in an amount from about 18 to about 32 wt %.

3. The composite material of claim 1, wherein the ceramic material is the metal oxide selected from the group consisting of alumina, alumina doped with other metal ions, zirconia, aluminosilicates, yttria, yttria stabilized zirconia, magnesia stabilized zirconia, zircon, zirconia toughened alumina, silica, mullite, and combinations thereof.

4. The composite material of claim 3, wherein the ceramic is alumina.

5. The composite material of claim 4, wherein the ceramic material is alumina in an amount of about 18 to about 32 wt %.

6. A protective composite coating comprising:
   i. a first component represented by a modified MCrAlY and characterized by an absence of silicon and hafnium, wherein
   M comprises Co in an amount of about 45 to about 75 wt %, Ni in an amount of 0 to about 12 wt %, and Fe in an amount of 0 to about 12 wt %;
   Cr is in an amount of about 15 to about 25 wt %;
   Y is in an amount of about 0.1 to about 1 wt %;
   Al is in an amount of about 5 to about 10 wt %;
   Nb is in an amount of about 6 to about 15 wt %;

ii. a second component comprising a ceramic material dispersed within the first component in an amount of about 15 to about 45 wt % of the protective composite coating.

7. The protective composite coating of claim 6, wherein the ceramic material is a metal oxide selected from the group consisting of alumina, alumina doped with other metal ions, zirconia, aluminosilicates, yttria, yttria stabilized zirconia, magnesia stabilized zirconia, zircon, silica, zirconia toughened alumina, mullite, and combinations thereof.

8. The protective composite coating of claim 7, wherein the ceramic material is alumina in an amount of about 18 to about 32 wt %.

9. The protective composite coating of claim 8, wherein the modified MCrAlY is capable of forming an alumina layer on the surface of the protective coating.

10. The protective composite coating of claim 7, wherein the coating has an oxygen content of about 7 to about 25 wt %.

11. The protective composite coating of claim 6, wherein the coating is characterized by a selective oxidation layer of alumina scale from about 2 to about 25 micrometers.

12. An article comprising a substrate and the coating of claim 6, wherein said coating is disposed on the substrate.

13. The protective coating of claim 6, wherein the coating is a bond coat disposed between a substrate and a thermal barrier coating.

* * * * *